United States Patent [19]

Peris et al.

[11] Patent Number: 5,325,749
[45] Date of Patent: Jul. 5, 1994

[54] MACHINE TOOL HAVING A QUICK RELEASE DRAW TUBE AND JAW CHUCK ADAPTER

[75] Inventors: James P. Peris; Gregory Ayzenshtok, both of Horseheads; Terrence M. Sheehan, Elmira, all of N.Y.

[73] Assignee: Hardinge Brothers, Inc., New York, N.Y.

[21] Appl. No.: 31,412

[22] Filed: Mar. 15, 1993

Related U.S. Application Data

[62] Division of Ser. No. 717,520, Jun. 19, 1991, abandoned.

[51] Int. Cl.[5] .................... B23B 31/16; B23B 31/20
[52] U.S. Cl. ........................ 82/142; 82/147; 279/4.12; 279/143
[58] Field of Search .............. 82/127, 142, 147, 165; 409/231, 233; 408/239 R; 279/4, 50, 75, 4.1, 4.12, 51, 137, 143, 144, 145, 146; 29/38 B

[56] References Cited

U.S. PATENT DOCUMENTS

| 1,961,605 | 6/1934 | Drissner et al. | 82/147 |
| 1,979,366 | 11/1934 | Cone . | |
| 2,181,358 | 11/1939 | Anslinger . | |
| 2,262,849 | 11/1941 | Knecht . | |
| 2,375,115 | 5/1945 | Kylin | 279/1 |
| 2,375,734 | 5/1945 | Montgomery et al. . | |
| 2,476,781 | 7/1949 | Tomlinson | 279/4 |
| 2,478,195 | 8/1949 | Hull | 279/1 |
| 2,782,044 | 2/1957 | Gabriel et al. | 279/4 |
| 2,793,040 | 5/1957 | Wilson | 279/4 |
| 3,148,889 | 9/1964 | Frei | 279/4 |
| 3,160,420 | 12/1964 | Simpson | 279/110 |
| 3,289,504 | 12/1966 | Bergonzo | 82/142 |
| 3,361,433 | 1/1968 | Haldridge | 279/4 |
| 3,498,618 | 3/1970 | Hultgren | 279/4.12 X |
| 3,643,969 | 2/1972 | Finley et al. | 279/20 X |
| 3,746,353 | 7/1973 | Allen | 279/51 |
| 4,061,076 | 12/1977 | Robertson | 407/49 X |
| 4,122,755 | 10/1978 | Johnson et. al. | 409/233 |
| 4,647,051 | 3/1987 | Stone et al. | 279/119 X |
| 4,688,810 | 8/1987 | Waite | 279/71 X |
| 4,943,071 | 7/1990 | Srebot et al. | 279/43 |

FOREIGN PATENT DOCUMENTS 2120667 1/1972 Fed. Rep. of Germany .......... 279/1

Primary Examiner—Z. R. Bilinsky
Attorney, Agent, or Firm—Cushman, Darby & Cushman

[57] ABSTRACT

A machine tool having a quick release draw tube includes a headstock with a spindle. A draw tube is slidably supported within the spindle and includes inner and outer surfaces. The draw tube includes a series of circumferentially spaced holes on the outer surface thereof. A draw tube locking or unlocking device cooperates with the spindle and includes a ball detent that is selectively received in one of the recesses provided on the draw tube for locking the same within the spindle. The machine tool also includes an adapter plate for mounting over the extended nose of the spindle for substituting a collet by a jaw chuck.

10 Claims, 4 Drawing Sheets

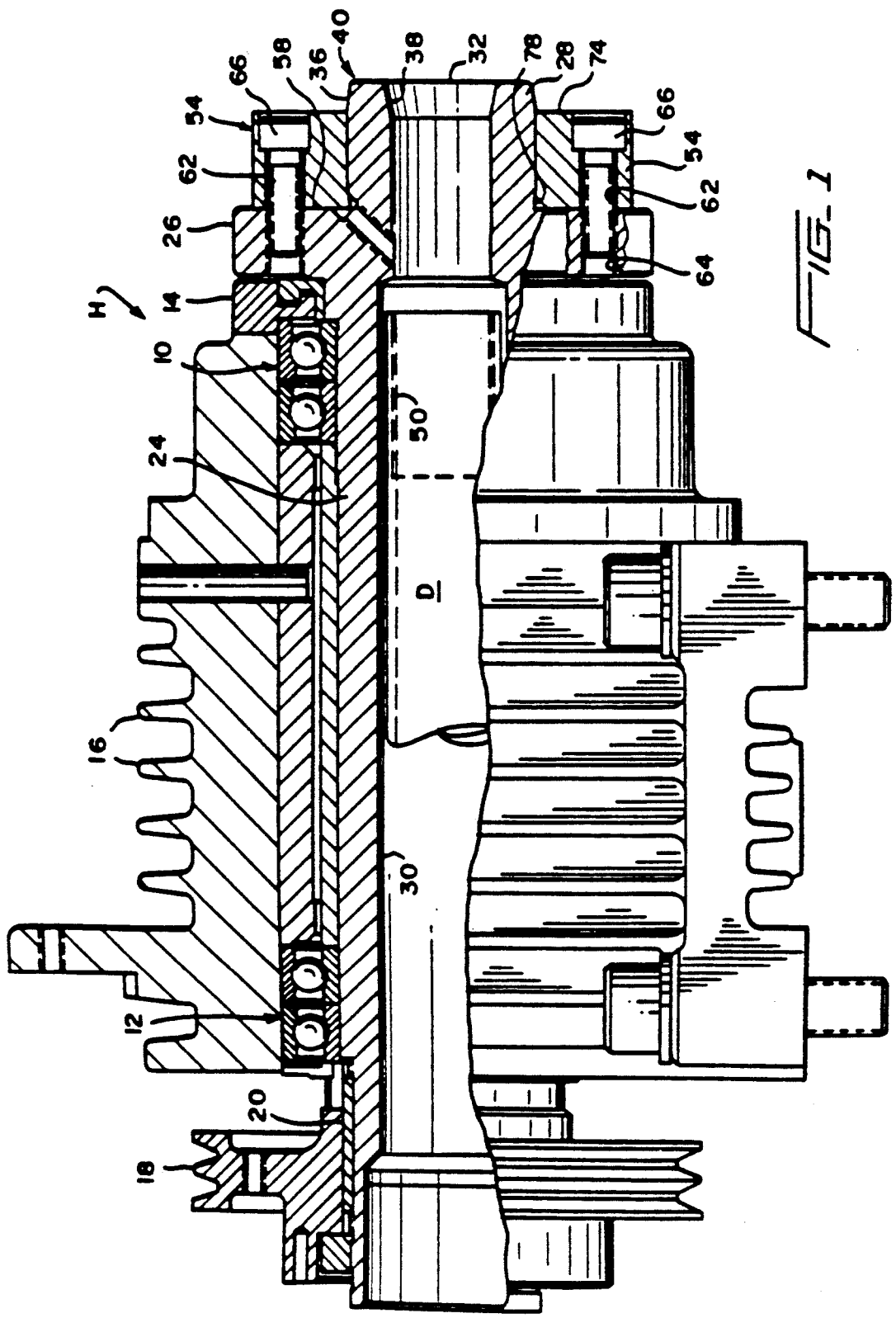
FIG_1

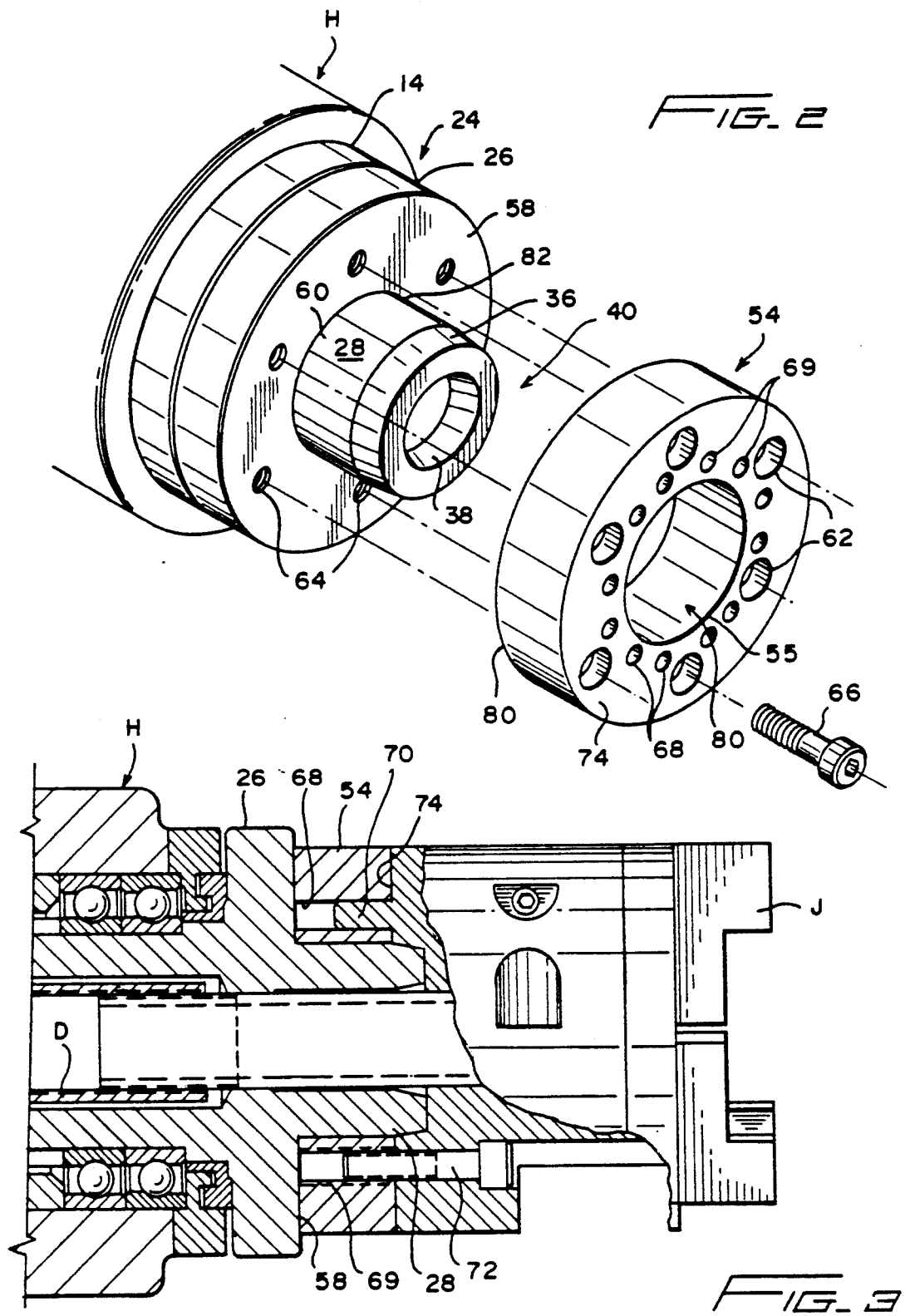

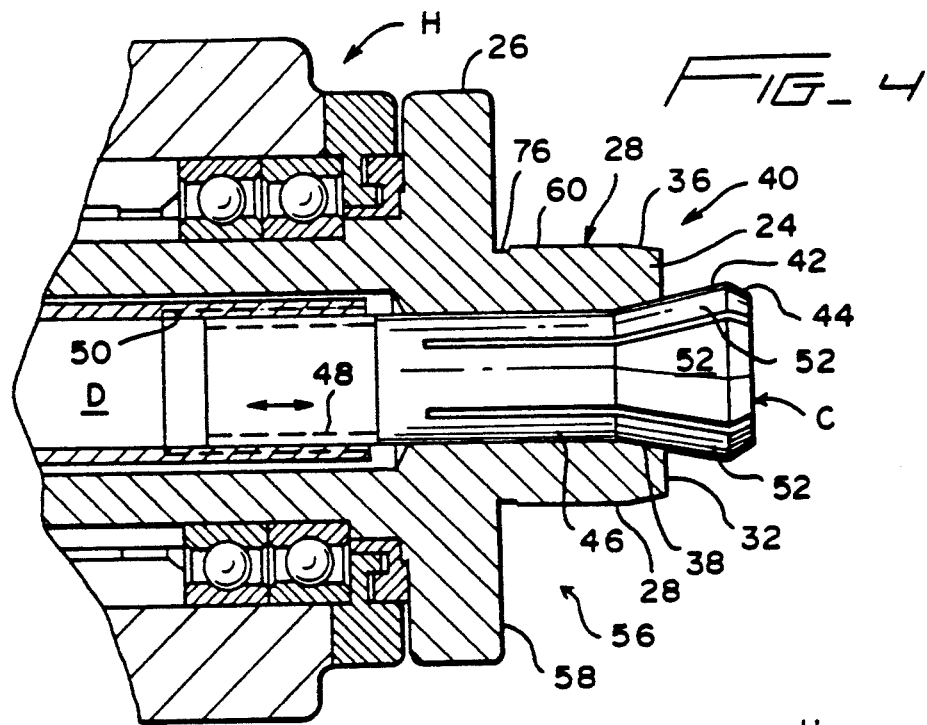
FIG_4
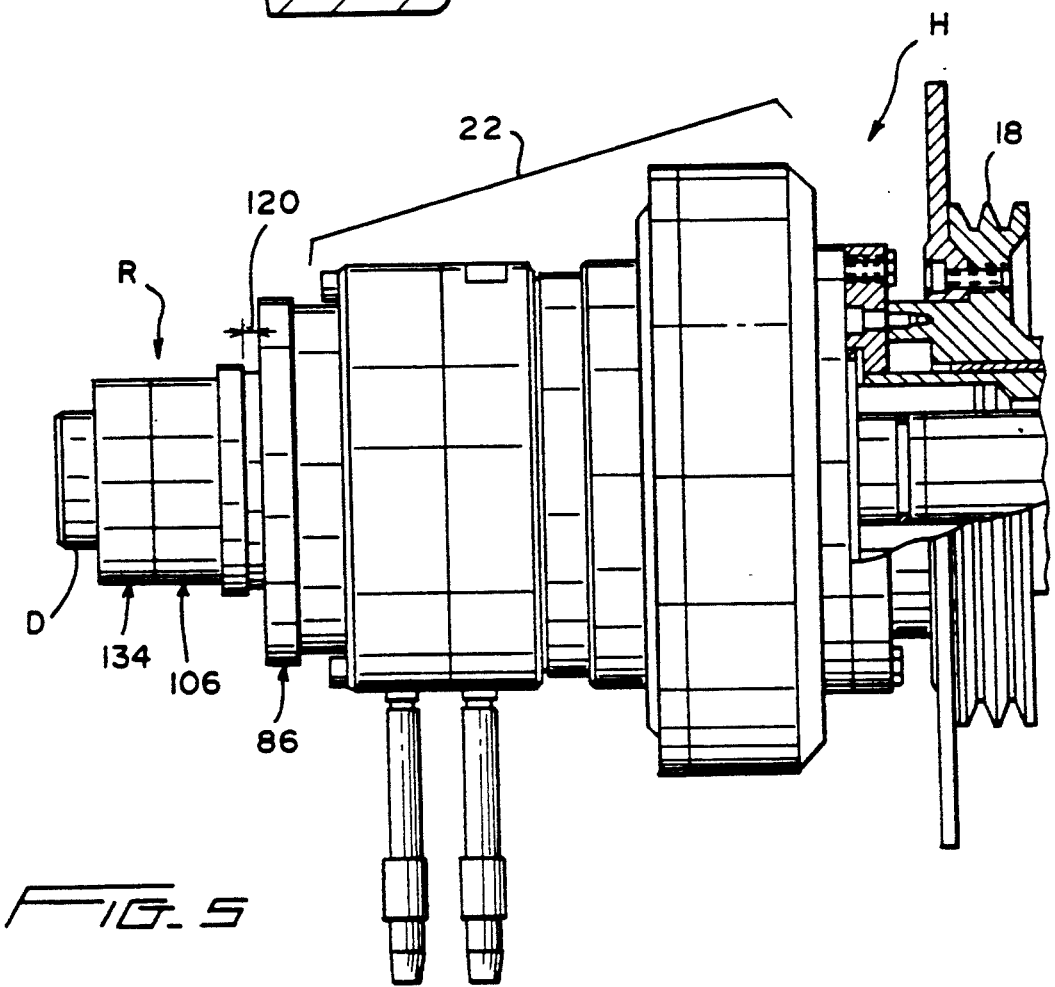
FIG_5

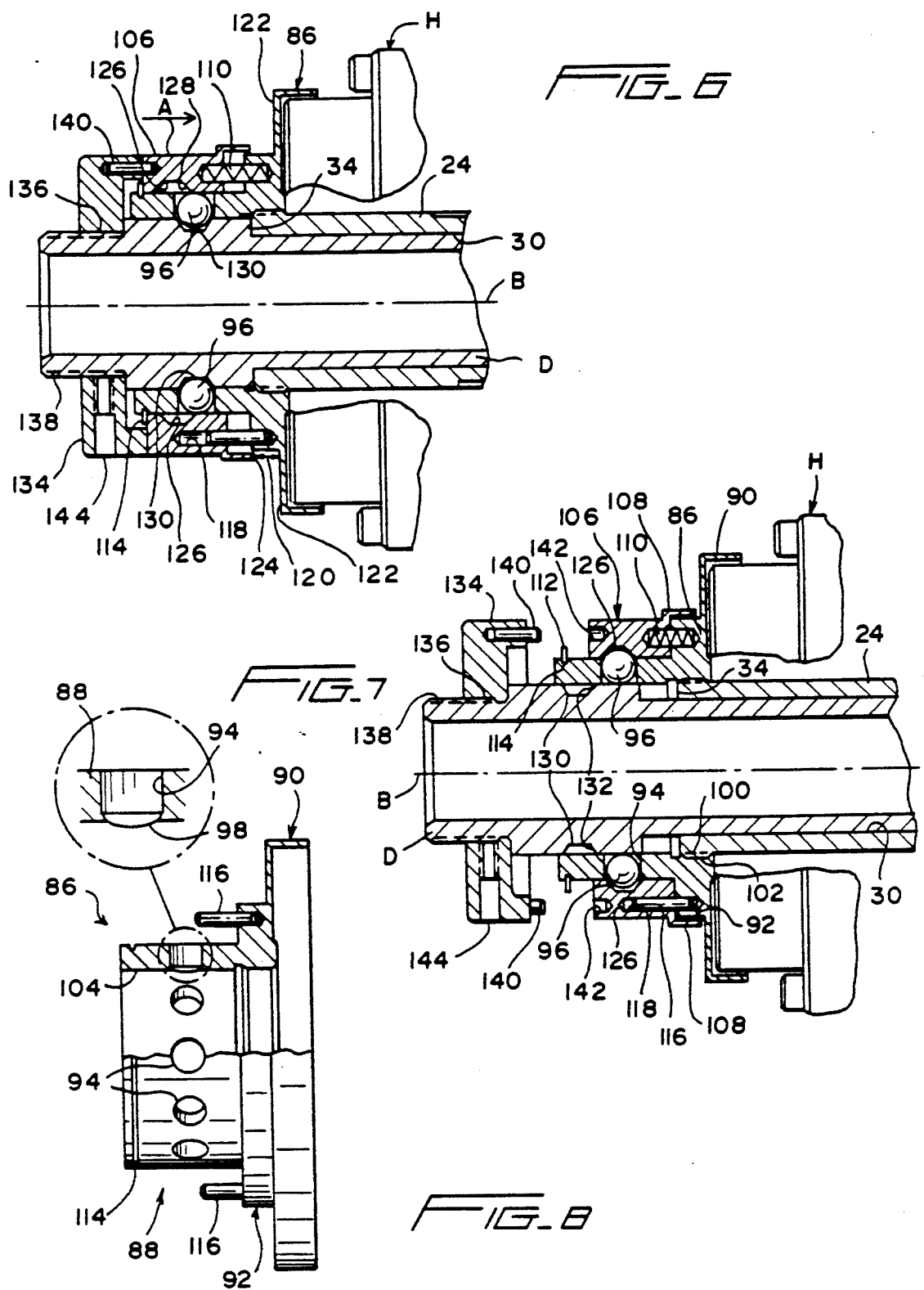

MACHINE TOOL HAVING A QUICK RELEASE DRAW TUBE AND JAW CHUCK ADAPTER

This is a division of application Ser. No. 07/717,520, filed Jun. 19, 1991, now abandoned.

FIELD AND HISTORICAL BACKGROUND OF THE INVENTION

The present invention is directed to machine tools, and more particularly to a machine that includes a quick release draw tube and a headstock adapter for a jaw chuck.

In machine tool industry, it is a known practice to disassemble the collet closer assembly in order to replace, repair or provide maintenance to draw spindle-tube that is rotatably maintained in the main spindle of the headstock. The main function of the draw tube is to grasp and hold a workpiece holder, such as a collet or chuck, during the machining operation. Over time, the draw tube is worn out and thus requires maintenance. Moreover, the draw tube may need to be replaced when the existing draw tube is broken or becomes unsuitable for further use. The only manner by which the draw tube can be replaced or repaired, is to disassemble the collet closer assembly, which requires shutting down the machining operation and further requires substantial attention on the part of a skilled technician to provide maintenance. This procedure is no doubt inefficient and adds to the labor cost of machining a workpiece.

Notwithstanding this recurrent problem, the industry has been unable to provide a solution which is efficient, fast and easy to work with. Therefore, there is a need in the machine tool industry for a mechanism by which a draw tube can be easily replaced, repaired or otherwise serviced, and which eliminates long machine down time.

Further, there is also a need in the art for an adapter device that allows a machine operator to mount a jaw chuck or the like workpiece holder on the headstock in place of a collet easily and without substantial effort.

OBJECT AND SUMMARY OF THE INVENTION

The principal object of the present invention is to provide a machine tool that includes a mechanism for fast-release of the draw tube from the headstock.

Another principal object of the present invention is to provide a machine tool in which an adapter device can be easily mounted on the headstock to selectively mount a jaw chuck or collet thereon for holding the workpiece during the machining operation.

Another object of the present invention is to provide a machine tool which eliminates long down time and wherein it is easy to replace, repair or otherwise maintain the draw tube.

Yet another object of the present invention is to provide a headstock for a machine tool which costs substantially less to maintain and is easy to repair.

Yet another object of the present invention is to provide a headstock for a machine tool which is versatile in that a jaw chuck or collet can be mounted thereon without having the need to modify or replace the main spindle.

An additional object of the present invention is to provide headstock for a machine tool in which the spindle nose is specifically configured for providing substantially more clearance space so as to easily maneuver the tool carriage assembly for having a better access to the workpiece.

In summary, the main object of the proposed invention is to provide a machine tool with a unique mechanism for quick release of the draw tube from the spindle for maintenance, and an adapter device for substituting a jaw chuck for a collet on the headstock thereof.

BRIEF DESCRIPTION OF THE DRAWINGS

The above and other objects and advantages and novel features of the present invention will become apparent from the following detailed description of the preferred embodiment of the invention, illustrated in the accompanying drawings, in which:

FIG. 1 illustrates a headstock for a machine tool, partly in section, shown with the jaw chuck adapter plate mounted on the spindle thereof, in accordance with the present invention;

FIG. 2 is a partial perspective exploded view of the headstock shown in FIG. 1;

FIG. 3 is a partial longitudinal sectional view of the headstock shown in FIG. 1, shown with a draw chuck mounted on the spindle;

FIG. 4 is a view similar to FIG. 3, shown without the adapter plate, but with a collet mounted on the spindle in place of the draw chuck;

FIG. 5 is a partial elevational view of the headstock of the present invention showing the draw tube release mechanism mounted on the end of the headstock lying opposite to the workpiece holding end;

FIG. 6 is a partial longitudinal sectional view of the headstock shown in FIG. 5, showing the draw tube in the locked position within the spindle;

FIG. 7 is a view similar to FIG. 6, showing the draw tube in the unlocked position; and FIG. 8 is a side elevational view, partly in section, of the draw tube locking nut, with a portion enlarged to show the configuration of the holes therein.

DETAILED DESCRIPTION OF THE INVENTION

FIG. 1 illustrates headstock H for mounting on a machine tool and is equipped with conventional elements, such as front and rear bearing assemblies 10 and 12, front cap assembly 14, cooling fins 16, drive pulley 18, pulley key 20, etc. FIG. 5 illustrates collet closer assembly 22 mounted to headstock H adjacent drive pulley 18.

In accordance with the present invention, the headstock H includes spindle 24 rotatably mounted therein. The spindle 24, as best shown in FIGS. 1–4, includes collar 26 and an extended nose 28. A recess 30 extends longitudinally the length of spindle 24 for receiving a collet C through right end opening 32 (FIG. 4) and a draw tube D from an opposite left end opening 34 (FIGS. 6–7). The spindle nose 28 includes external and internal chamfered surfaces 36 and 38, respectively, at nose tip portion 40, best shown in FIG. 1, 2, and 4.

The internal chamfered surface 38 of nose portion 40 comes in sliding contact with bevelled surface 42 of collet head 44 and when collet body 46 which is in locking engagement with draw tube D by interlocking screw-threads 48 and 50, respectively, is drawn to the left (FIG. 4) by actuating collet closer assembly 22, internal chamfered surface 38 functions as a cam against surface 42 thereby allowing jaws 52 to be clamped or closed together. Collet jaws 52 can likewise be opened by sliding draw tube D to the right, as shown in FIG. 4, by actuating collet closer assembly 22 (FIG. 5).

As shown in FIG. 1-3, an adapter plate 54 of the present invention can be mounted over spindle nose 28 in the recess area 56 (FIG. 4) defined by collar surface 58 and external periphery 60 of nose 28. The adapter plate 54 thus makes it possible to substitute collet C for a jaw chuck J as desired.

The adapter plate 54 includes radially spaced equidistant screw-threaded holes 62 that extend through the thickness thereof and align with corresponding screw-threaded holes 64 in spindle collar 26. As shown in FIGS. 1 and 2, socket-screws 66 mechanically fasten adapter plate 54 to collar 26. The adapter plate 54 further includes equidistant holes 68 for receiving dowel pin 70 of jaw chuck J (FIG. 3). Some of the holes 69 in adapter plate 54 may be screw-threaded (FIG. 3) so as to receive set screw 72 for fastening Jaw chuck J to adapter plate 54.

The adapter plate 54 is generally a ring-shaped member including a central opening 55 having a diameter slightly larger so as to slide adapter plate 54 over spindle nose 28. As best shown in FIGS. 1 and 3, the thickness of adapter plate 54 is less than the length of spindle nose 28 such that when adapter plate 54 is mounted thereon, tip portion 40 of spindle nose 28 extends past outer surface 74 of adapter plate 54. The provision of adapter plate 54, therefore, makes headstock H more versatile in that it could either be used with a collet type chuck as well as a jaw type chuck.

As best shown in FIGS. 1, 2 and 4, spindle nose 28 includes an annular grove 76 extending into the external peripheral surface 60 thereof which receives annular flange 78 provided on internal circumferential surface 80 of adapter plate 54. The annular flange 78 of adapter plate 54 therefore assists the operator in securely and properly aligning plate 54 on the nose 28. It would be apparent to those of ordinary skill in the art that external nose surface 60 and internal surface 80 of adapter plate 54 are made smooth for easy sliding therebetween.

FIGS. 5-8 illustrate mechanism R by which draw tube D can be easily retracted out from spindle 24. As best shown in FIG. 8, release mechanism R includes spindle nut 86 having a smaller diameter front sleeve portion 88 and larger diameter rear flange portion 90 separated by an intermediate shoulder portion 92. The front portion 88 includes equidistant circumferential holes 94 each of which includes a radially movable ball detent 96. As best shown in FIG. 8, each hole 94 has lower opening 98 having a diameter slightly less than the diameter of ball 96 such that when draw tube D has been withdrawn from spindle 24, the balls 96 do not slide out inwardly. It should be noted, however, that the internal diameter of holes 94 allows balls 96 to slide or oscillate freely therein along a direction transverse to central longitudinal axis of spindle 24. The spindle nut 86 has threads 100 on internal perimeter of portion 92 that cooperate with threads 102 on spindle 24 for mounting nut 86 thereon. The nut 86 has a central opening 104 for allowing draw tube D to slide therethrough.

A ball release actuating nut 106 is slidably mounted on front portion 88 of nut 86. The release nut 106 has a stepped flange portion 108 that slides over shoulder 92 of spindle nut 86. As shown in FIGS. 6 and 7, compression spring 110 is biased between spindle nut 86, and release nut 106 slides over front portion 88 of nut 86 against the compression force of spring 110, as indicated by arrow A in FIG. 6. The release nut 106 is retained on nut 86 by retaining clip 112 mounted in annuler grove 114 in the front portion 88. Therefore, when nut 106 is released after having been moved to the right (FIG. 7) from its initial position shown in FIG. 6, release nut 106 will return to its initial position against retaining clip 112 by the force of spring 110.

As best shown in FIG. 8, spindle nut 86 includes dowel pins 116 spaced on shoulder 92 thereof and are received in corresponding recesses 118 of release nut 106 for a proper alignment therebetween. As shown in FIG. 6, a clearance 120 exists between flange surface 122 of spindle nut 86 and rear surface 124 of release nut 106 for allowing nut 106 to slide back and forth relative to spindle nut 86. The release nut 106 includes equidistantly spaced ball receiving recesses 126 on the internal peripheral surface thereof that come to align with ball detent holding holes 94 in spindle nut 86.

The recesses 126 include a frustoconical surface 128 that functions as a cam for sliding or ejecting out ball detent 96 inwardly (FIG. 7) when, as described below in detail, release nut 106 is moved back to its initial position shown in FIG. 6, and draw tube D is inside spindle 24, such that ball receiving recesses 130, equidistantly spaced on the external surface of tube D, are in alignment with holes 94. Recesses 130 also include frustoconical cam surfaces 132 that eject ball detents 96 out therefrom to recesses 126 from the position shown in FIG. 6.

As best shown in FIGS. 6-7, an adjustment nut 134 is mounted on draw tube D by screw-threads 136 provided on the internal perimeter surface thereof that engage with screw-threads 138 provided on draw tube D. The adjustment nut 134 includes dowel pins 140 that are received in corresponding recesses 142 in release nut 106 for proper alignment of nut 134 on release nut 106.

As best shown in FIGS. 6-7, spindle nut 86, ball release nut 106 and adjustment nut 134 are all concentric to central longitudinal axis B of draw tube D. In FIGS. 6 and 7, reference numeral 144 designates a set-screw 144 for preventing accidental release of adjustment nut 134 from draw tube D.

OPERATION

Operation of headstock H with adapter plate 54 is straightforward. When it is desired that jaw chuck J be substituted for collet C, adapter plate 54 is simply mounted over spindle nose 28 and collet C removed by actuating collet closer assembly 22. When adapter plate 54 has been secured to nose 28, jaw chuck J is simply mounted over adapter plate 54 and secured thereto for use. Collet C can likewise be substituted on spindle nose 28 by simply removing jaw chuck J and adapter plate 54.

When the release and removal of draw tube D is required from its locked position shown in FIG. 6, the operator simply slides release nut 106 towards headstock H, shown by arrow A in FIG. 6, so that recesses 126 therein are aligned with ball detents 96 in spindle nut 86 (FIG. 7). The operator then pulls draw tube D away from headstock H (to the left as seen in FIG. 7) so that ball detents 96 are forced radially outwardly away from recesses 130 of draw tube D. When draw tube D is being pulled to the left and away from headstock H, cam surfaces 132 of recesses 130 push ball detents 96 radially outwardly so that they are now received in recesses 126 in release nut 106, FIG. 7. Once all ball detents 96 have been moved out from respective recesses 130 of draw tube D, and are received into corresponding recesses 126 in release nut 106, draw tube D becomes free to be pulled out.

It should be noted that in the locked position shown in FIG. 6, the draw tube D is relatively immobile as portions of ball detents 96 are received in recesses 130 on draw tube D and thus the ball detents 96 cannot be moved radially outwardly, as recesses 126 in release nut 106 are in out of alignment with or offset from recesses 130. However, when the operator slides release nut 106 towards headstock H, recesses 126 come into alignment with ball detents 96 and they could be moved therein. In this manner, balls 96 function as locking detents that move in and out of corresponding recesses 130 provided on draw tube D for locking or unlocking the same with spindle 24.

As can be seen from the above, the release mechanism R is fast and easy to operate and further eliminates the need to disassemble the collet closer assembly 22 for replacing or otherwise maintaining draw tube D.

While this invention has been described as having a preferred design, it is understood that it is capable of further modifications, uses and/or adaptations of the invention following in general the principle of the invention and including such departures from the present disclosure as come within the known or customary practice in the art to which the invention pertains, and as may be applied to the central features hereinbefore set forth, and fall within the scope of the invention and of the limits of the appended claims.

What is claimed is:

1. A machine tool device for converting a machine tool headstock to selectively mount a collet or jaw chuck thereon for holding a workpiece, the device comprising:
a spindle constructed and arranged to be rotatably mounted in the headstock of a machine tool, said spindle including first and second ends and a diameter, said first end of said spindle including a flange portion and a concentric projection member extending from said flange portion, said projection member being constructed and arranged to releasably hold a collet; and
an adaptor removably mounted to said flange and adapted to receive a jaw chuck for use instead of said collet.

2. The machine tool of claim 1, wherein:
said projection member has an outer diameter;
said adapter includes a central cavity having an inner diameter; and
the inner diameter of said cavity in said adapter is greater than the outer diameter of said projection member.

3. The machine tool of claim 2, wherein:
said adapter includes first and second surfaces and has a thickness; and
said cavity extends between said first and second surfaces and substantially through the thickness thereof.

4. The machine tool of claim 3, wherein:
said adapter includes a plurality of equidistant holes radially spaced from said central cavity thereof.

5. The machine tool of claim 2, wherein:
said adapter comprises a ring shaped member.

6. The machine tool of claim 1, wherein:
said projection member comprises a tip portion; and
said tip portion includes a bevelled surface on external periphery thereof.

7. The machine tool of claim 1, wherein:
said projection member comprises a tip portion including inside and outside walls; and
said tip portion includes a bevelled surface on the inside wall thereof.

8. The machine tool of claim 1, wherein:
said first end of said spindle includes a recessed area surrounding said projection member and said adaptor includes an annular flange adapted to mate with said recessed area when said adaptor is coupled to said flange portion of the spindle.

9. The machine tool device of claim 1, wherein:
said adaptor has a central cavity which receives said projection member, said projection member extending beyond an end of said adaptor.

10. The device of claim 1, wherein:
said adaptor includes means for mounting a jaw chuck thereto.

* * * * *